United States Patent [19]

Coates

[11] Patent Number: 4,884,890
[45] Date of Patent: Dec. 5, 1989

[54] METHOD FOR NORMALIZING THE DETECTION SIGNALS OF MAGNIFIED IMAGES OF FLUORESCING MATERIALS

[75] Inventor: Vincent J. Coates, Palo Alto, Calif.
[73] Assignee: Nanometrics Incorporated, Sunnyvale, Calif.
[21] Appl. No.: 160,330
[22] Filed: Feb. 25, 1988
[51] Int. Cl.$^4$ .............................................. G01B 11/02
[52] U.S. Cl. .................................... 356/384; 356/387; 250/459.1
[58] Field of Search ............... 356/384, 386, 387, 237, 356/445; 250/459.1

[56] References Cited

U.S. PATENT DOCUMENTS

| 3,643,101 | 2/1972 | Shipp et al. | 356/384 |
| 4,050,821 | 9/1977 | Cuthbert et al. | 356/384 |
| 4,373,817 | 2/1983 | Coates | 356/384 |

FOREIGN PATENT DOCUMENTS 0092306  5/1984  Japan .................................. 356/237

OTHER PUBLICATIONS

"Critical-Dimension Control in the Late Eighties", Toro-Lira et al., Microelectronic Manufacturing and Testing, vol. 8, No. 1, 1-1985, 1-14.
"Evaluating Optical Linewidth Measurement Systems", 7-1986.

Primary Examiner—Vincent P. McGraw
Assistant Examiner—S. A. Turner
Attorney, Agent, or Firm—Linval B. Castle

[57] ABSTRACT

A feedback method, or automatic gain control circuit, for an image photosensor at the focal plane of an optical system for very narrow linewidth measurements of images having varying intensities such as fluorescing photoresist coated lines. The feedback method includes the steps of measuring the instantaneous intensities of the entire optical beam of radiation with a photodetector and applying the output therefrom to the photosensor to thus normalize its output signal.

9 Claims, 1 Drawing Sheet

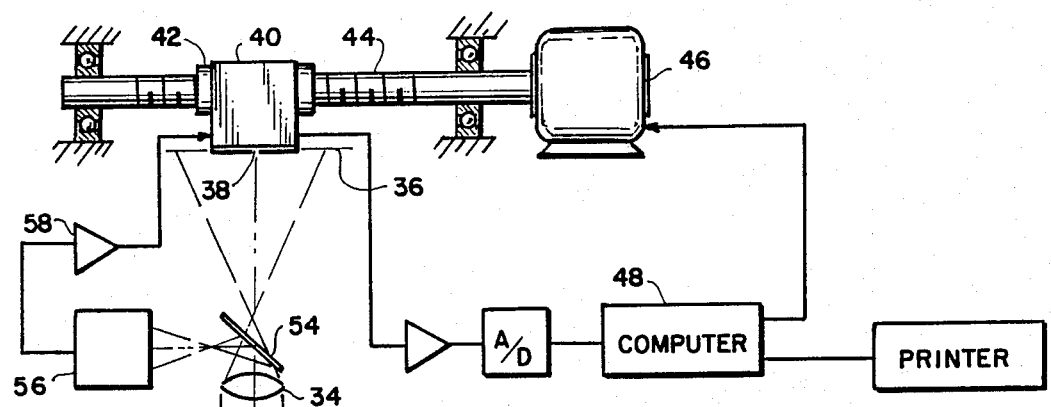
FIG. 1
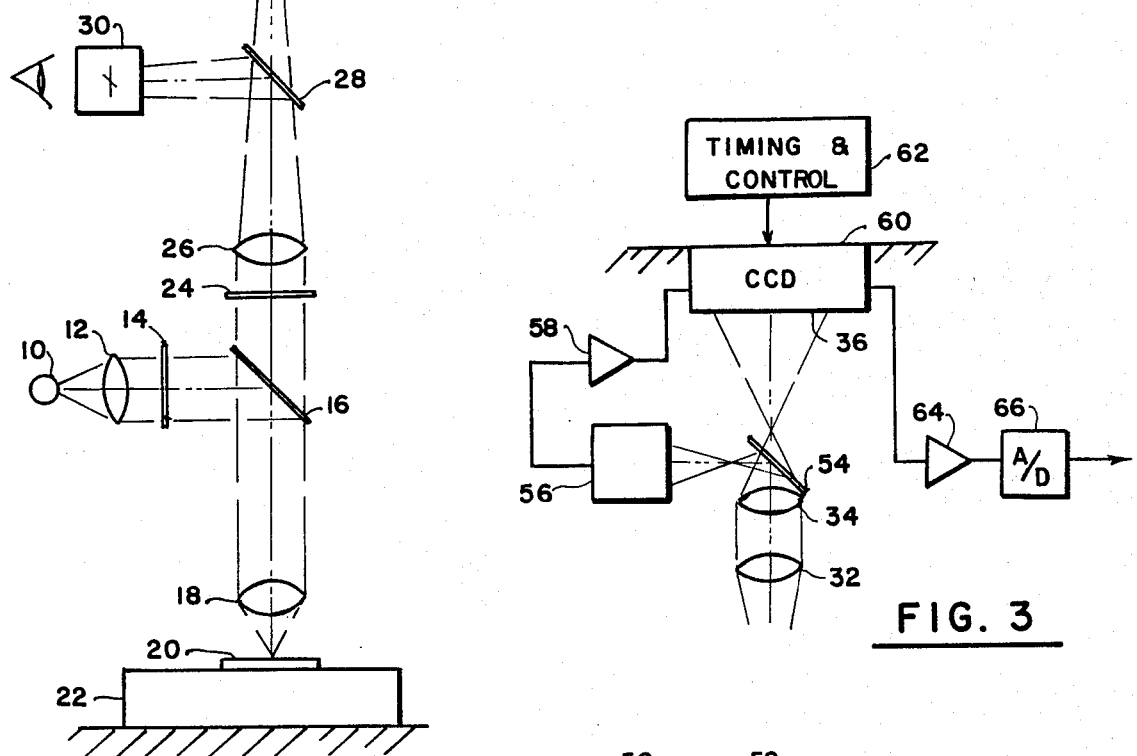
FIG. 3
FIG. 2
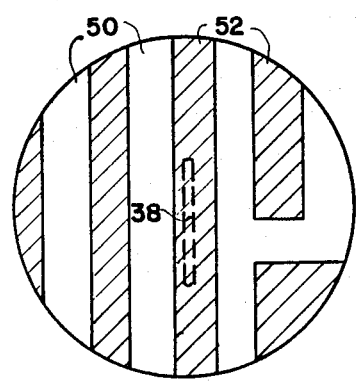

METHOD FOR NORMALIZING THE DETECTION SIGNALS OF MAGNIFIED IMAGES OF FLUORESCING MATERIALS

BRIEF SUMMARY OF THE INVENTION

This invention relates generally to optical measurements of very narrow lines such as conductors in electronic integrated circuits, and in particular to a method for correcting microscope measurement errors caused by intensity changes in fluorescing photoresist employed in the fabrication of integrated circuitry.

One of the most important requirements in the fabrication of very large scale integrated circuits is the accurate control of linewidths. The determination of these dimensions is critical for establishing optimum photolithographic parameters such as focus, alignment, exposure time, photoresist development time, as well as the values of the electrical quantities of the circuit elements formed within the circuitry. To be useful, it is generally considered that a linewidth measuring instrument should provide a result within plus or minus 2% of the physical dimension itself, with a repeatability of plus or minus 1%.

The instruments most suitable for the accurate determination of linewidths largely depend upon the linewidths themselves. As pointed out in the article, "Evaluating Optical Linewidth Measurement Systems", in the July 1986 issue of *Microelectronic Manufacturing and Testing*, linewidths greater than 1.25 micrometers are satisfactorily measured using standard brightfield optical systems, but for those in the 0.6 to 1.25 micrometer range a fluorescence instrument offers many advantages. The invention disclosed herein describes an improvement in the fluorescence instrument.

Most photoresist materials will fluoresce to some degree if illuminated with light of a proper wavelength and intensity. In the fabrication of integrated circuitry, a layer of photoresist material is applied to a circuit board by a photolithography process that reveals various openings of conductive material that is to be removed by an etching process. Thus, the photoresist pattern on the circuit board defines the remaining conductive material, i.e. the conductive lines to be measured by some linewidth measuring system. One type of fluorescence measuring system involves the flooding of the photoresist coated specimen with ultraviolet or visible light of a wavelength which causes the photoresist to fluoresce at longer wavelengths. A greatly enlarged image of a small sector of the specimen is then focused through a microscope and into a measurement module. This module may take the form of a slit in front of a photomultiplier tube on a traveling nut for measuring the distances between the edges of the enlarged lines in the projected image. Alternately, the measurement module may include a charge coupled device (CCD) detector which captures the enlarged image in one sequence. Such a CCD image acquisition system has been described in the proceedings of the SPIE Symposium on Microlithography in Santa Clara, C.A., in 1987, and published in SPIE Vol. 775, pages 134 et seq.

One serious problem exists with such a linewidth measuring system. When a photoresist material fluoresces, its fluorescent light output can increase or decrease rapidly during an initial period of time because of photochemical reactions within the material. This phenomena is referred to as quenching. The output signal from a photomultiplier or CCD sensor in the measurement module will vary as a result of this.

Briefly described, the improvement involves the reflecting of a portion of the entire optical field through a beam splitter placed near the eyepiece pupil of the microscope to collect a small sample of all radiation in the optical field. This sample is detected by a photodiode detector, amplified, and is either applied as feedback to the dynode of the photomultiplier or to a CCD sensor to thus equalize its intensity measurements.

DESCRIPTION OF THE DRAWINGS

In the drawings which illustrate the preferred embodiment of the invention:

FIG. 1 is a schematic illustration of the linewidth measuring system with signal normalizing feedback into a photomultiplier detector, FIG. 2 is an illustration depicting a typical projected image at the plane of the slit o the photomultiplier detector, and FIG. 3 is a schematic illustration of the linewidth measuring system employing signal normalizing feedback into a CCD sensor.

DETAILED DESCRIPTION OF THE PREFERRED EMBODIMENT

The linewidth measuring system illustrated in FIG. 1 includes a microscope in which short wavelength excitation at approximately 436 nanometers generated by a mercury arc lamp 10, is collimated by a lens 12, filtered by a narrow pass band blue filter 14, reflected by a dichroic beamsplitter 16 and focussed by the microscope objective lens 18 upon the surface of a specimen 20 mounted on a conventional adjustable XY stage 22. As previously explained, the surface of the specimen has been previously photolithographed with a photoresist pattern representing conductors and various components of integrated circuitry which, when exposed to such radiation, will fluoresce.

The sharply focused fluorescing pattern on the specimen 20 is enlarged by the infinity corrected objective lens 18 and the collimated beam therefrom is now transmitted through the dichroic beamsplitter 16 which, having previously reflected radiation in the blue range, now transmits radiation in the longer wavelength red range. The collimated red beam transmitted by the beamsplitter is filtered by a barrier filter 24 to remove any residual blue that may have been reflected from the excitation source, and the collimated redbeam is then focussed by the microscope main magnifying lens 26 into a converging beam that is reflected by a beamsplitter 28 to a eyepiece 30 having suitable crosshairs to enable an operator to accurately adjust the specimen 20 to a desired position on the microscope axis.

The converging beam from the magnifying lens 26 is also transmitted through the beamsplitter 28 to a projection eyepiece including a field lens 32 and magnifying lens 34 which focuses a greatly enlarged image of the specimen on a projection image plane 36 and to a measurement module which, in FIG. 1, includes a photomultiplier tube (PMT) 40. The focused beam is thus projected upon a narrow slit 38 in front of the PMT 40 mounted on a traveling nut 42 which is moved laterally across the image plane 36 on a bearing mounted screw 44 by a motor 46, which is preferably a stepping motor controlled by a digital computer 48. The computer 48 also receives digitized output signals from the PMT and is thus able to display a PMT output amplitude at any of a great plurality of small lateral positions of the PMT.

FIG. 2 is a diagram depicting a typical view of a greatly enlarged portion of the specimen 20 as focused on the projection image plane 36 and PMT slit 38. In FIG. 2 the white sections 50 represent fluorescing sections of radiated photoresist and the hatched portions 52 represent sections of material not covered by photoresist. Illustrated in dashed lines is a typical PMT slit 38 positioned to be laterally scanned across the enlarged image. The fluorescing sections 50 may represent insulated areas between conductive lines to be measured and which typically may have linewidths in the order of about one micrometer.

It is to be noted that the detailed description to this point describes a prior fluorescence linewidth measurement system such as that shown in the aforementioned publication "Microelectronic Manufacturing and Testing" of July 1986. The improvement now to be described provides an automatic gain control which normalizes the PMT output signal to eliminate errors caused by the inherent instabilities in the output of fluorescing photoresist materials.

Positioned at or near the projection eyepiece pupil of FIG. 1, and at a location which will sample the entire beam of radiation from the fluorescing specimen, is a beamsplitter 54 which reflects the beam sample to a photodetector 56 which may be a silicon photodetector or another PMT. The output of the detector 56 is suitably amplified by amplifier 58 and applied to the dynode of the PMT 40 to thus provide a feedback or gain control signal which will vary during changes in the unstable radiation beam to normalize the output of the PMT 40. If desired, an alternate normalization method may be performed by the computer 48 in which an "initial" output of the photodetector 56 is read, digitized and stored in the computer 48. The output of the PMT 40 is then normalized by multiplying its value by a normalization value which is the ratio of the current from the photodetector 56 read at the same instant as the PMT output divided by the initial photodetector output value stored by the computer. The correction thus provided will allow immediate measurements of an illuminated photoresist coated specimen without waiting for its fluorescent output to become stabilized.

FIG. 3 is a schematic drawing partially illustrating the measuring system illustrated in FIG. 1 but replacing the PMT 40, its associated slit 38 and scanning hardware with a charge coupled device (CCD) detector 60 which rapidly captures the entire image and which has a large array of very small, adjacent, sensing elements which are individually charged according to the illumination exposing each element at the image plane 36. Associated with the CCD 60 is timing and control circuitry 62 which generates signals that serially pass the charges on the elements from the CCD through the amplifier 64 and to the analog to digital converter 66 which translates the charges and hence the exposure values into digital form for use by the computer 48 shown in FIG. 1. With a record of the dimensions and spacing of the individual sensing elements in the CCD and the magnification of the optical system, the computer can then readily determine line widths and spacings on the surface of the specimen 20.

Although the CCD sensor operates more rapidly than the previously described photomultiplier sensor, the inherent instabilities in the output of fluorescing photoresist materials still require a normalized signal detection system for high accuracy measurements. Therefore, the normalizing signal produced by the photodetector 56, as previously discussed, may be applied to the CCD 60 either through a control input to the CCD or through the timing and control circuitry 62.

I claim:

1. In combination with an optical system for focusing a beam of radiation containing magnified images of an illuminated fluorescing material on a plane having means for scanning across said beam and containing a photosensor, a method for normalizing the detection by said photosensor against errors caused by intensity variations in the fluorescence of said material said method comprising the steps of:

measuring the intensity of the entire beam of radiation during the scanning of said beam; and applying an electrical signal representing the instantaneous measured intensity of said entire beam of ratiation as feedback to adjust the gain of the photosensor.

2. The method claimed in claim 1 wherein the intensity of the entire beam of radiation is measured by the steps of:

providing a photodetector, the electrical output signal from which is applied to said photosensor.

3. A method for measuring the widths of very narrow lines on the surface of a specimen, said narrow lines being coated with a a photoresist material, said method comprising the steps of:

flooding said specimen surface with radiation having an intensity and wavelength that causes said photoresist material to fluroesce, the intensity of the fluorescing photoresist material being variable;

optically enlarging the image of said specimen surface to form an optical beam focused at a focal plane;

sampling the intensity of the entire optical beam with a beamsplitter directing a portion of said entire beam to a photodetector for generating an output signal indicative of an instantaneous intensity of said beam; and detecting portions of said focused optical beam and said fluorescing narrow line images with a photosensor, said photosensor being coupled to the output signal from said photodetector for compensating the output signals from said photosensor for intensity variations in the fluorescing photoresist.

4. The method claimed in claim 3 wherein the output signals from said photosensor are digitized for acceptance by a digital computer.

5. The method claimed in claim 4 wherein said photosensor is a charge coupled device image detector.

6. The method claimed in claim 4 wherein said photosensor is a photomultiplier tube positioned behind a narrow slit at said focal plane and moved across said focal plane by a lead screw rotated by a motor controlled by said digital computer.

7. The method claimed in claim 3 wherein the step of flooding said specimen includes the step of introducing a high intensity blue light to a dichroic beamsplitter which reflects said blue light through an infinity corrected objective lens to said specimen surface, the light emanating from the fluorescent surface of said specimen having a long wavelength which is transmitted through said objective lens and along an optical axis through said dichroic beamsplitter.

8. The method claimed in claim 7 wherein the step of optically enlarging includes said infinity corrected objective lens, an imaging lens forming a converging optical beam, an operator's eyepiece viewing said specimen surface through a beamsplitter in said beam, and a projection eyepiece for focusing the image of said specimen surface at said focal plane.

9. The method claimed in claim 8 wherein said step of sampling includes the positioning of a beamsplitter near the pupil of said projection eyepiece for directing a portion of the entire beam to said photodetector.

* * * * *